United States Patent [19]

Yunker et al.

[11] 4,276,710

[45] Jul. 7, 1981

[54] AQUACULTURE POND AND HARVESTER

[76] Inventors: Michael P. Yunker, 3906 Old Pali Rd., Honolulu, Hi. 96817; David K. Barclay, P.O. Box 911, Kapaau, Hi. 96755

[21] Appl. No.: 98,640

[22] Filed: Nov. 29, 1979

[51] Int. Cl.³ .............................................. A01K 79/00
[52] U.S. Cl. .............................................. 43/4; 37/55; 119/2
[58] Field of Search .................................. 119/2–4; 43/1, 4, 4.5, 7, 6.5, 26.1, 27.2, 100, 103, 104; 37/55, 119

[56] References Cited

U.S. PATENT DOCUMENTS

| 734,571 | 7/1903 | Knapp | 37/119 |
|---|---|---|---|
| 3,113,389 | 12/1963 | Vuskovich | 37/119 |
| 3,553,879 | 6/1969 | Ellis | 119/3 X |
| 3,608,217 | 9/1971 | Voisin, Sr. | 37/119 X |
| 3,715,831 | 2/1973 | Mason | 43/4.5 |

Primary Examiner—Clifford D. Crowder
Attorney, Agent, or Firm—Oldham, Oldham, Hudak & Weber Co.

[57] ABSTRACT

A device for harvesting shrimp, prawn, and other aquaculture from man-made ponds. The device includes an elongated truss which is maintained at each end thereof by a carriage. Depending from the truss are a plurality of support arms maintaining at the ends thereof rows of flexible tines. A net extends between the support arms and is connected to the tines. The truss is maintained above the pond with a carriage on each side and is moved over the pond such that the tines contact the pond bottom, stirring aquaculture therefrom and into the net. Preferably, the pond is of a rectangular shape having an inclined ramp at one end thereof, the ramp emptying into a trough, such that the device may move the aquaculture up the ramp and into the trough from which it may be finally harvested.

12 Claims, 9 Drawing Figures

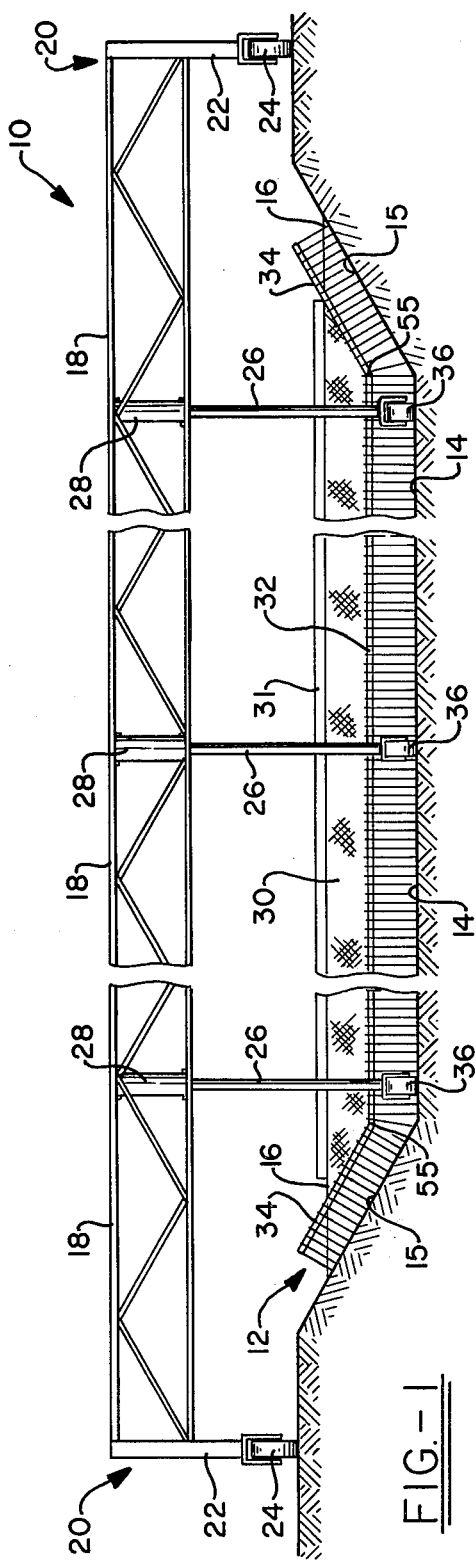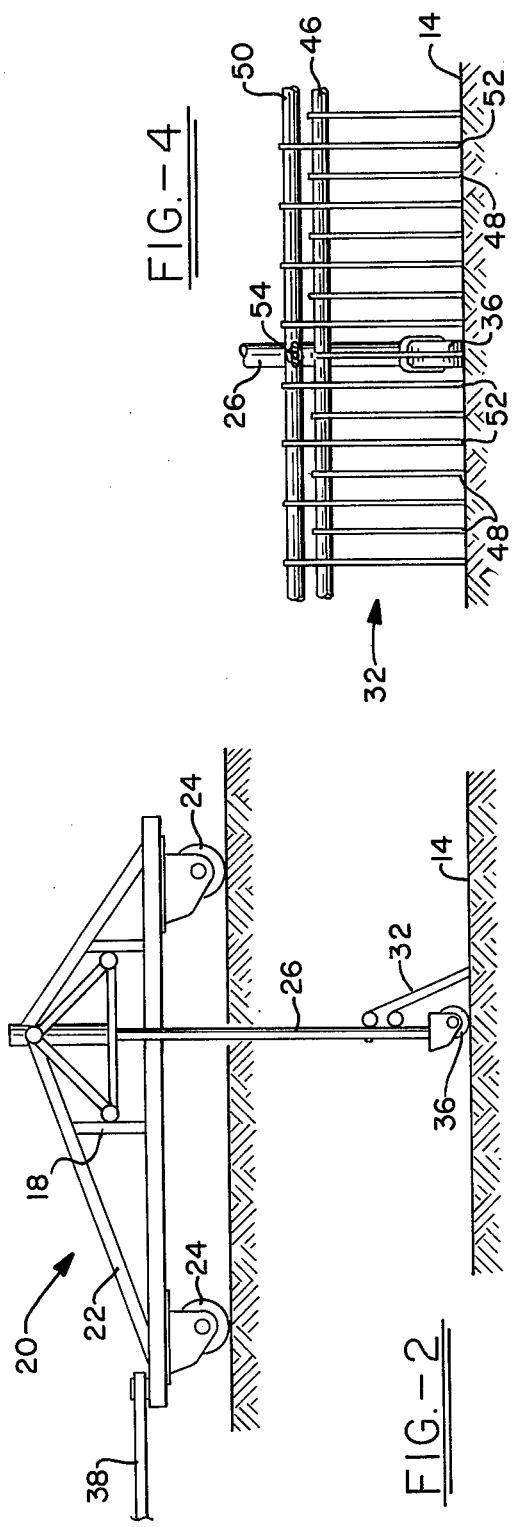

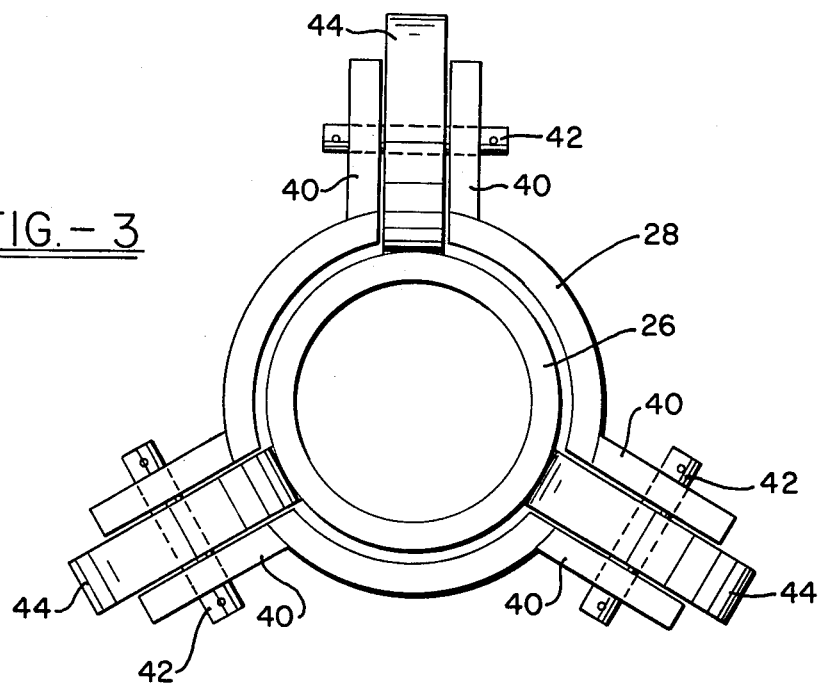
FIG.-3
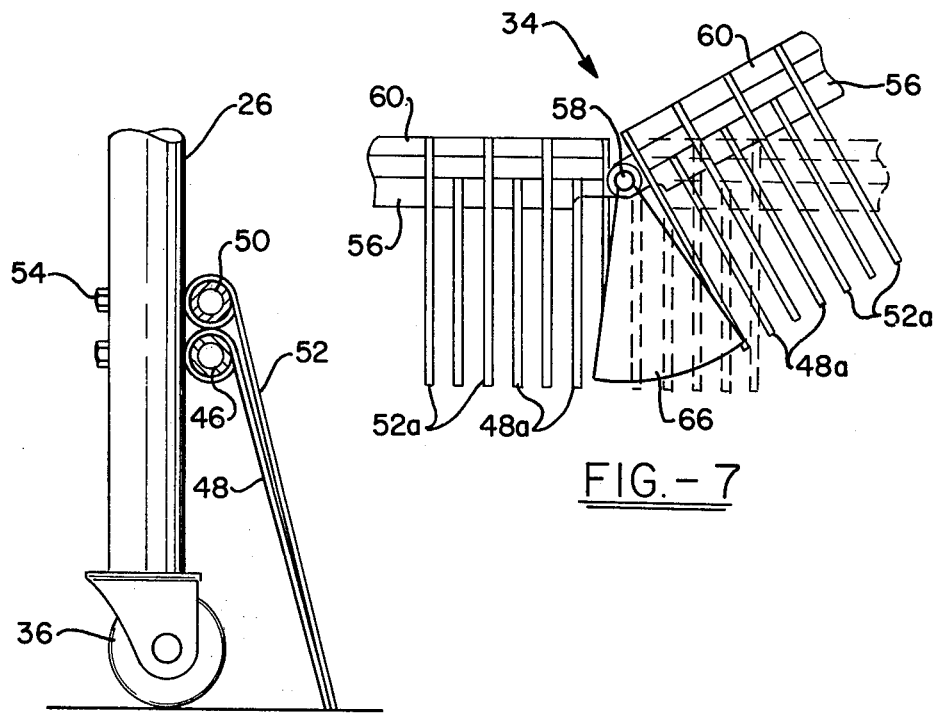
FIG.-5
FIG.-7

AQUACULTURE POND AND HARVESTER

BACKGROUND OF THE INVENTION

The instant invention resides in the art of apparatus for raising and harvesting aquaculture. Particularly, a first portion of the invention relates to a pond structure and design in which aquaculture may be raised. The second portion of the invention relates to a device by which such aquaculture may be harvested from the pond.

Heretofore in the art, a large number of devices have been developed for utilization in retrieving shrimp, oysters, prawn, and the like from the sea. The most pertinent prior art teachings known to applicant are those of U.S. Pat. No. 3,608,217, wherein a plurality of teeth are used for stirring up the waters' bed for the purpose of catching oysters. The device is adapted to be towed by a tongue and is dragged along the ocean floor by means of skids. Further teachings of general interest in the art are those shown in U.S. Pat. Nos. 255,561; 297,079; 1,336,203; 1,959,793; 3,651,595; 3,775,891; and 3,777,388. While all of these prior art teachings relate in general to apparatus for harvesting aquatic life from the ocean, none of them are seen as bearing directly upon the novel features of the harvester presented as part and parcel of the invention herein.

The prior art also teaches the utilization of man-made ponds or pools for raising shrimp, prawn, and the like, and from which such aquatic life may be harvested for market. Such man-made pools allow the cultivation of such aquatic life in a substantially controlled environment and in a confined area from which harvesting is less time consuming and expensive than from the sea itself. Indeed, aquaculture, or the cultivation of aquatic organisms under conditions monitored and maintained by man, has become quite a profitable industry in the area of freshwater prawns, marine shrimp, and certain species of marine and freshwater fish. The ponds constructed for such aquaculture have tended toward large rectangular shapes covering an area of 0.5–3.0 acres. Typically, the water depths of such ponds have run 3–4 feet, with the ponds being excavated in earthen soil of a nature capable of retaining water. While such ponds have proved suitable for raising the aquaculture, removal of the marketable animal from the pond has proven to be rather expensive and time consuming.

In conventional rectangular shaped ponds, the harvesting technique requires that four or more persons enter the pond with a seine net. To keep the seine net vertical in the water, it is buoyed on top and weighted on the botton. The net is placed around the periphery of the pond and walked slowly toward one of the pond corners. This concentrates the animals into a small area where they can be removed and placed in containers for marketing. The harvest rate for a person operating in this manner has been calculated to be 0.75 acre per hour. Not only is this method of harvesting time consuming, it is also inefficient in that many of the animals escape the net by forcing their way under the weighted bottom or by securing themselves in depressions or holes in the floor of the earthen pond. These holes or depressions are caused by the intrusion of people walking the seine net about the pond.

Another method of harvesting animals from such ponds is that known as drain harvesting. Ponds adapted for such technique are provided with a bottom sloping to a drain which is used for evacuating the water from the pond, leaving animals stranded about the drain for ready retrieval by laborers. While this technique is very effective for removing animals from the pond, the equipment and energy necessary for draining and filling the ponds is expensive. Further, many cultured species have different growth rates, reducing the effectiveness of drain harvesting because only a certain portion of the total population of pond animals are, at any given time, of marketable size.

OBJECTS OF THE INVENTION

In light of the foregoing, it is an object of the instant invention to provide an aquaculture harvester which alleviates the need for persons to enter the water when harvesting aquatic animals.

Another object of the invention is to provide an aquaculture harvester which is characterized by a high efficiency of removal of aquatic animals from a pond.

Still a further object of the invention is to provide an aquaculture harvester which is adjustable for harvesting selected sizes of aquatic animals while leaving smaller animals in the water for further growth.

Yet an additional object of the invention is to provide an aquaculture harvester wherein the harvest technique may be performed by a single individual without the need for that person to enter the water.

Yet another object of the invention is to provide a pond structure adapted for raising aquaculture and which is constructed to facilitate harvesting by a single individual.

Still a further object of the invention is to provide a pond structure for raising aquaculture which is characterized by a harvesting ramp and trough to which aquatic animals may be driven for harvesting.

Yet another object of the invention is to provide an aquaculture harvester and pond structure which are relatively simplistic in design, reliable in function, and which provide increased efficiency and economy over prior art embodiments.

SUMMARY OF THE INVENTION

Certain of the foregoing and other objects of the invention which will become apparent as the detailed description proceeds are achieved by an aquaculture harvester, comprising: an elongated truss maintained at each end thereof by a carriage; a plurality of support arms depending from said truss; scraper means connected to and extending between bottom sections of said support arms for making contacting engagement with a water bed; and a net connected to and extending between said support arms, said net being operatively connected to said scraper means.

Other objects of the invention are achieved by a pond for raising aquaculture, comprising: an elongated bed having a first section thereof of uniform depth below a horizontal plane; a ramp in a second section of said bed, said ramp having a first end thereof in communication with said bed at said uniform depth and rising at a second end thereof substantially to said horizontal plane; and a trench at said second end of said ramp.

DESCRIPTION OF DRAWINGS

For a complete understanding of the objects, techniques, and structures of the invention, reference should be had to the following detailed description and accompanying drawings wherein:

FIG. 1 is a front plan view of the harvester of the invention, showing the same in operation within a pond;

FIG. 2 is a side plan view of the structure of FIG. 1, showing the structure of a carriage of the harvester;

FIG. 3 is a cross-sectional view of a self-adjusting support arm of the invention;

FIG. 4 is a partial front plan view of the tine assembly utilized for contacting and agitating the pond bottom;

FIG. 5 is a side plan view of the tine assembly of FIG. 4;

FIG. 7 is a front plan view of a hinged end tine assembly showing the utilization of a seal connected at the hinge.

DETAILED DESCRIPTION OF PREFERRED EMBODIMENT

Figure 6A:
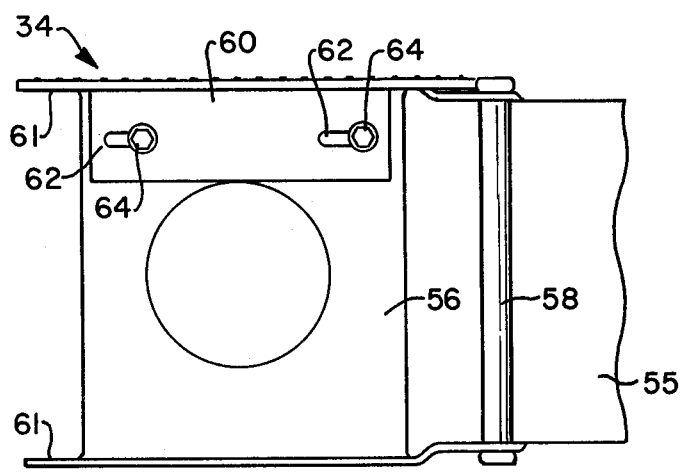
FIGS. 6A and 6B are respective top and side plan views of the hinged end tine assembly of the aquaculture harvester.

Referring now to the drawings and more particularly FIG. 1, it can be seen that the aquaculture harvester assembly of the invention is designated generally by the numeral 10. Here, the harvester is shown in operative association with a man-made pond 12 of the particular nature to be described hereinafter and of the type used for raising aquaculture of the type hereinbefore described. Suffice it to say that the pond 12 has a bed 14 which may be earthen, gravel, or of other suitable form. Typically, the bed 14 slopes upwardly at the sides 15 due to purposeful construction or erosion. The pond is filled with water to a waterline 16, which, as will be discussed hereinafter, is maintained at a level below the operative structure of the harvester 10. A main truss, or framework, 18, provides the principal supportive structure of the harvester assembly 10 and may be constructed of steel, aluminum, or other appropriate material. It is contemplated that the truss 18 could be made of tubular elements to be telescopic for accommodating various pond sizes, in which case the horizontal truss member would be of a telescopic nature, while the angled truss member would operate as a pantograph. In any event, the truss or framework 18 is supported at each end thereof by a carriage assembly 20.

As best shown with combined reference to FIGS. 1 and 2, the carriage 20 comprises a carriage truss structure 22 mounted upon casters 24. These casters are preferably of the type which may be selectively locked or allowed to pivot with respect to the truss 22. In the locked position, the casters 24 will urge the associated carriage assembly 20 in a straight line path, as would be preferred during the harvesting operation in a particular pond. When transporting the assembly 10 from one pond to another, the casters 24 may be unlocked to freely swivel with respect to the associated carriage 20 to facilitate maneuverability.

Depending from the main truss 18 are a plurality of support arms 26 which are preferably of a tubular nature, reciprocatingly received within appropriate sleeves 28 which are fixedly secured to the truss. A net 30 is interconnected by means of a metal rod 31 between the various support arms 26, and is preferably maintained above the waterline 16 a distance of approximately one foot. The net 30 extends downwardly to the top portion of the tine or scraper assembly 32 to which it is preferably attached. The tine assembly 32 is fixedly secured between the various support arms 26, and has at each end thereof a hinged end tine assembly 34 for making contacting engagement with the sloped sides 15 of the pond 12. Finally, at the bottom of each of the support arms 26 is a wheel 36, which is preferably of a nonpivotal nature for stability purposes. While a wheel 36 is preferred for ease of movement, the invention contemplates that a skid may be substituted therefor.

The casters 36 roll the net-tine assembly combination 30-34 along the bottom of the pond 12, retrieving aquaculture therefrom. As shown in FIG. 2, a tongue, or tow bar, 38, is provided on one or both of the carriage assemblies 20 for attachment to a tractor, tow motor, or the like. It will be understood that with the casters 24 locked so as to be non-pivotal with respect to the associated carriage 20, a single tractor could pull the entire assembly through a pond. Of course, it will also be appreciated that the assembly 10 could include a self-contained drive means for such motivation.

With final attention to FIG. 2, it will be noted that the carriage truss 22 and the carriage assembly 20 are designed with the main truss 18 and the support arms 26 set behind the geometric center thereof. In such manner, stability of the entire assembly 10 is maintained when being towed by a tractor or the like.

With reference now to FIG. 3, it can be seen that the sleeves 28, which are welded or otherwise affixed to the truss 18, include roller housings 40 maintaining rollers 44 pivotal upon pins or axles 42. The rollers 44 act as bearings for the support arms 26 received in associated sleeves 28 to provide for free vertical movement thereof. Such structure allows the support arms 26, moving with the casters 36, to maintain the tine assembly 32 in contacting engagement with the bed 14. As the casters 36 track across any elevational changes of the bed 14, the associated arm 26 moves on the rollers 44 within the sleeve 28 to cause the tine assembly 32 to make a corresponding elevational change.

As shown in FIGS. 4 and 5, the tine or scraper assembly 32 includes a first bar or rod 46 fixedly secured between the various support arms 26. Attached in fixed spaced relationship along the bar 46 are a plurality of tines 48. An adjustable rod or bar 50 is provided with tines 52 fixedly attached thereto in the same spaced relationship as the tines 48. The bar 50 is adjustable by means of the slot and bolt adjustment assembly 54 wherein the bar 50 is slotted and receives therethrough a bolt in threaded engagement with the support arm 26. The slot is preferably of a width equal to the spacing of the tines 52.

With further reference to the tine assembly 32, it should be noted that the tines 48,52 are of such length as to extend slightly below the casters 36, and are preferably made of a hard, yet flexible, material such as plastic, hard rubber, spring steel, or the like. The tines 48,52, which are preferably of a slightly arcuate nature and of a length of approximately eighteen inches, are thus pulled behind the line of the casters 36 in forceful, agitating engagement with the bed 14, stirring aquaculture from the bed as the assembly 10 is moved through the pond 12. Such aquaculture is then either stirred into the net 30, or ahead of the tine assembly 32, to ultimate capture at the end of the pond, as will be discussed hereinafter.

The tines 48 are preferably spaced on their bar 46 at one inch intervals, as are the tines 52 on their bar 50. The adjustability of the bar 50 thus allows the gap between alternate tines 48,52 to be adjusted to openings of between one-half inch and one inch. This adjustability allows the harvester to selectively harvest aquaculture of a particular size or maturity, animals smaller than that size being able to escape through the caps defined by the tines 48,52. Further escape possibilities are available by selection of the mesh comprising the net 30. Accordingly, the pond 12 may be continually used for raising aquaculture such as shrimp, prawn, fish, and the like, with selective harvesting being achieved.

Figure 6B:
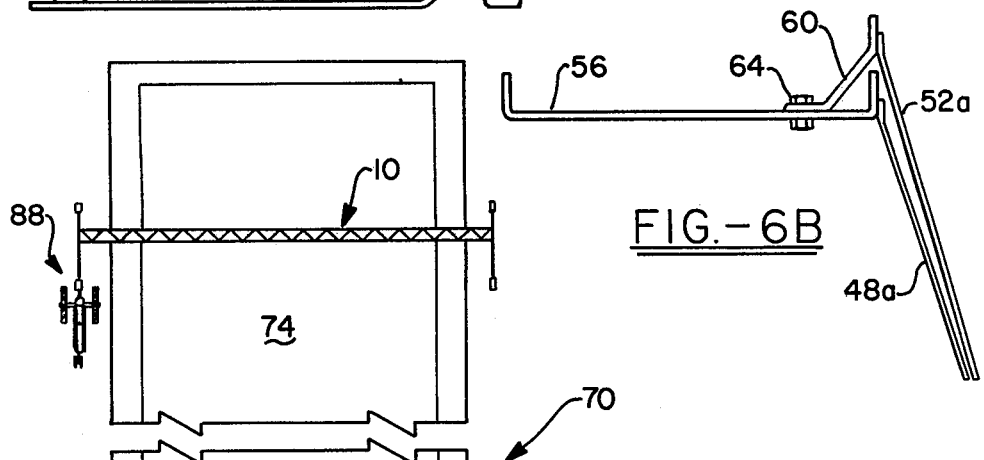

As shown in FIG. 1, extending past the end support arms 26 are respective end plates 55, which are appropriately connected thereto. In the embodiment shown in FIGS. 4 and 5, the plate 55 might be of the flat, rectangular nature shown in FIG. 6A, welded directly to the end support arms 26. It will be understood that the bars or rods 46,50 could themselves be of angle iron or other similar construction, in which case, the end plate 55 would be merely an extension of the elements 46,50. In any event, a frame plate 56 is hingedly connected to each of the end plates 55 by an appropriate hinge or other pivot means 58. As shown in FIGS. 6A and 6B, tines 48a are fixedly secured to the frame plate 56, while tines 52a are fixedly secured to the adjustment plate 60. The latter plate is characterized by slots 62 adapted for receiving adjustment bolts 64, which pass through aligned holes in the plate 56. Adjustment of the plate 60 with respect to the plate 56 via the slots and bolts 62,64 provides for adjustment of the tines 48a,52a, as previously discussed above.

It will also be noted that the plate 56 is characterized by holes 61 at an end thereof opposite the hinge 58. These holes are adapted for receiving yet another hinged plate 56 with adjustable tines, if so desired. As will be apparent hereinafter with respect to the operation of the invention, the plates 56 comprise the hinged end tine assemblies 34 adapted for making aquaculture-retrieving engagement with the sloped sides 15 of the pond 12. Depending upon the length of the sloped sides 15, from erosion or purposeful construction, additional plates 56 may be linked together to accommodate the particular pond design. The hinged interconnection of the plates with each other and with the end plate 55 allows the hinged end tine assemblies 34 to adapt to various contours.

Referring now to FIG. 7, there is shown an end tine assembly 34 comprised of two links, 56,60. The links are hingedly interconnected by means of the hinge 58 to which is attached a triangular or pie-shaped seal or shield 66. Since the hinge 58 allows an angling between the various links and between the end plate 55 and the link connected thereto, shields 66 are interposed with each hinge 58 to cover any gaps which might occur between the tines at the point of hinged interconnection. The seal 66 may be of plastic, rubber, or other suitable material which is preferably noncorrosive. Thus, the various links of the end tine assemblies 34 may adapt to the sloped contours 15 of the pond 12 with the shields 66 preventing escape of aquaculture through any gaps.

Figure 8:
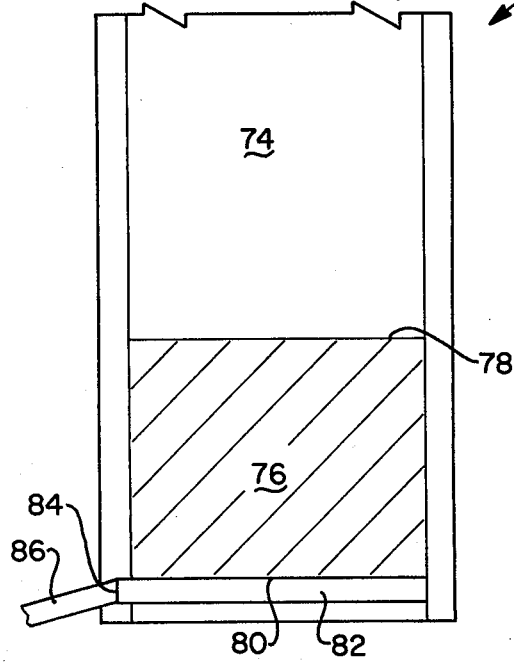
FIG. 8 is a top plan view of a pond structure of the invention schematically showing the utilization of a tractor-drawn harvester in association therewith.

With reference now to FIG. 8, there is shown an embodiment of a pond 70, constructed to be uniquely adapted for raising aquaculture and harvesting the same with the device 10 described hereinabove. The pond 70 would normally be constructed by simple removal of the earth, resulting in eroded or sloped sides 15. Of course, the pond could be defined by a concrete or other type of frame or casing 72, but such construction would add to the cost of the pond itself. An area 74 of the pond 70 is of fixed depth, preferably about three feet, with such depth decreasing in the area of the ramp 76. The ramp 76 rises from its bottom edge 78 to the front ledge 80 which communicates with a trough 82. Preferably, the front ledge 80 is approximately six inches below the water level of the pond itself. A gate 84 is operative at one end of the trough 82 for communication with a transfer trough 86 which may lead to a central processing area.

With continued reference to FIG. 8, it can be seen that a tractor 88 is diagrammatically shown in connection with the device 10. With the casters transporting the harvester 10 in a locked, non-swiveling position, the tractor 88 moves the harvester 10 from the fixed depth end of the pond 70 toward the ramp 76. During such transporting, the tines 48,52 are kept in contacting and agitating engagement with the pond bed 14. The hinged end tine assemblies 34 slope upwardly along the banks 15 to cause the tines 48a,52a to make similar contacting engagement. Changes in the surface of the bed 14 are accommodated by reciprocating support arms 26 movable upon the wheels 36. Further accommodation of minor depressions and the like in the bed 14 are made by the preferred flexible nature of the tines 48,52. Similarly, the hinged links comprising the end tine assemblies 34 accommodate changes in contour of the sloped banks 15, and changes in the slope or plane of the banks 15.

It will be appreciated that as the harvester 10 moves across the pond 70, the tines agitate the earth bed 14 and sloped bank 15 to stir aquaculture therefrom. The harvester 10 thus herds the aquaculture toward the harvest ramp 76 with much of the aquaculture being trapped in the net 30. Of course, aquaculture of a size small enough to escape through the mesh of the net 30 or through the gaps between the adjustable tines 48,52, are left to grow for a subsequent harvest. In any event, the harvester 10, motivated by the tractor 88, herds the aquaculture up the ramp 76 and into the trough 82. At this point, the aquaculture may be manually retrieved from the trough 82, or the gate 84 may be opened with the aquaculture being wasted through the trough 86 to a central processing area.

Thus it can be seen that the structure presented above is capable of raising and harvesting aquaculture using relatively simplistic and inexpensive apparatus which increases the efficiency of the harvest while reducing the cost and effort thereof. While in accordance with the patent statutes only the best mode and preferred embodiments of the invention have been presented and described in detail, it is to be understood that the invention is not limited thereto or thereby. Consequently, for an appreciation of the true scope and breadth of the invention, reference should be had to the following claims.

What is claimed is:

1. An aquaculture harvester, comprising:
   an elongated truss maintained at each end thereof by a carriage;
   a plurality of support arms depending from said truss;
   scraper means connected to and extending between bottom sections of said support arms for making contacting engagement with a water bed; and
   a net connected to and extending between said support arms, said net being operatively connected to said scraper means.

2. The aquaculture harvester according to claim 1 wherein said scraper means comprises two sets of tines in adjustable juxtaposition with each other.

3. The aquaculture harvester according to claim 2 wherein said tines are flexible.

4. The aquaculture harvester according to claim 2 wherein said tines obliquely extend behind a plane containing said support arms.

5. The aquaculture harvester according to claim 2 wherein said tines are arcuate.

6. The aquaculture harvester according to claim 1 wherein said support arms are reciprocatingly received within sleeves affixed to said truss.

7. The aquaculture harvester according to claim 6 wherein said sleeves include roller surfaces in contacting engagement with said support arms and wherein said support arms include a wheel at ends thereof.

8. The aquaculture harvester according to claim 1 wherein said truss is of tubular telescopic construction.

9. The aquaculture harvester according to claim 1 wherein said carriages include casters which may be selectively locked to prevent swiveling.

10. The aquaculture harvester according to claim 9 wherein at least one said carriage includes means for connecting said carriage to a drive means for moving the harvester.

11. The aquaculture harvester according to claim 1 which further includes end scraper means pivotally connected to said scraper means at ends thereof for making contacting engagement with side portions of the water bed.

12. The aquaculture harvester according to claim 11 wherein said end scraper means includes two sets of tines in adjustable juxtaposition with each other which further includes a shield interconnected between said end scraper means and said scraper means.

* * * * *